US009143206B2

(12) United States Patent
Zhang et al.

(10) Patent No.: US 9,143,206 B2
(45) Date of Patent: Sep. 22, 2015

(54) ANTENNA SELECTION WITH EMBMS

(71) Applicant: QUALCOMM Incorporated, San Diego, CA (US)

(72) Inventors: Xiaoxia Zhang, San Diego, CA (US); Gang Bao, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/172,876

(22) Filed: Feb. 4, 2014

(65) Prior Publication Data

US 2015/0222331 A1 Aug. 6, 2015

(51) Int. Cl.
*H04B 7/02* (2006.01)
*H04B 7/06* (2006.01)

(52) U.S. Cl.
CPC ................ *H04B 7/02* (2013.01); *H04B 7/0639* (2013.01)

(58) Field of Classification Search
CPC ........ H04B 7/02; H04B 7/024; H04B 7/0404; H04B 7/0413; H04B 7/0452; H04B 7/0602; H04B 7/0604; H04B 7/0608; H04B 7/061; H04B 7/0639; H04B 7/0691; H04L 1/0025; H04L 1/0026
USPC ......... 375/219, 220, 222, 227, 260, 267, 299, 375/347
See application file for complete search history.

(56) References Cited

U.S. PATENT DOCUMENTS 7,873,113 B2 1/2011 Takano et al.
8,224,314 B2 7/2012 Grant
8,380,135 B2 2/2013 Ko et al.
8,548,511 B2 10/2013 Banister et al.
2005/0113048 A1 5/2005 Miyahara et al.
2005/0185707 A1* 8/2005 Hoo et al. .................... 375/224
2006/0165156 A1 7/2006 Kanemoto et al.
2007/0071149 A1 3/2007 Li et al.
2008/0051046 A1 2/2008 Ruckriem et al.
2009/0111542 A1 4/2009 Luschi et al.
2009/0252077 A1 10/2009 Khandekar et al.
2010/0232336 A1* 9/2010 Choudhury et al. .......... 370/312
2011/0116438 A1* 5/2011 Tsunekawa et al. .......... 370/312
2012/0287875 A1* 11/2012 Kim et al. .................... 370/329
2012/0314665 A1* 12/2012 Ishida et al. ................. 370/329
2013/0094422 A1* 4/2013 Thanikachalam ............ 370/312
2013/0142033 A1* 6/2013 Zhang .......................... 370/216
(Continued)

FOREIGN PATENT DOCUMENTS

EP 1608083 A1 12/2005
EP 1753157 A1 2/2007
EP 2650964 A1 10/2013
(Continued)

OTHER PUBLICATIONS

International Search Report and Written Opinion—PCT/US2015/014094—ISA/EPO—Jun. 8, 2015.
(Continued)

*Primary Examiner* — Leon Flores
(74) *Attorney, Agent, or Firm* — Arent Fox LLP

(57) ABSTRACT

A method, an apparatus, and a computer program product for wireless communication are provided. The apparatus determines at least one signal metric and selects a number of antennas from among a set of antennas for receiving a multicast/broadcast signal based on the at least one signal metric.

26 Claims, 12 Drawing Sheets

(56) References Cited

U.S. PATENT DOCUMENTS

2014/0192917 A1* 7/2014 Nam et al. .................... 375/267
2014/0364065 A1* 12/2014 Pu et al. ..................... 455/67.11

FOREIGN PATENT DOCUMENTS

WO 2009094744 A1 8/2009
WO 2011019977 A1 2/2011
WO 2011084717 A1 7/2011

OTHER PUBLICATIONS

Tao Z., et al., "Antenna Selection at the Mobile Station; C80216m-08_170R1", IEEE Draft; C80216M-08_170R1, IEEE-SA, Piscataway, NJ USA,—vol. 802.16m, No. r1, Mar. 10, 2008, pp. 1-14, XP017791144, [retrieved on Mar. 10, 2008] the whole document.

* cited by examiner

ANTENNA SELECTION WITH EMBMS

BACKGROUND

1. Field

The present disclosure relates generally to communication systems, and more particularly, to antenna selection with evolved Multimedia Broadcast Multicast Service (eMBMS).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus determines at least one signal metric and selects a number of antennas from among a set of antennas for receiving a multicast/broadcast signal based on the at least one signal metric.

DETAILED DESCRIPTION

Figure 1:
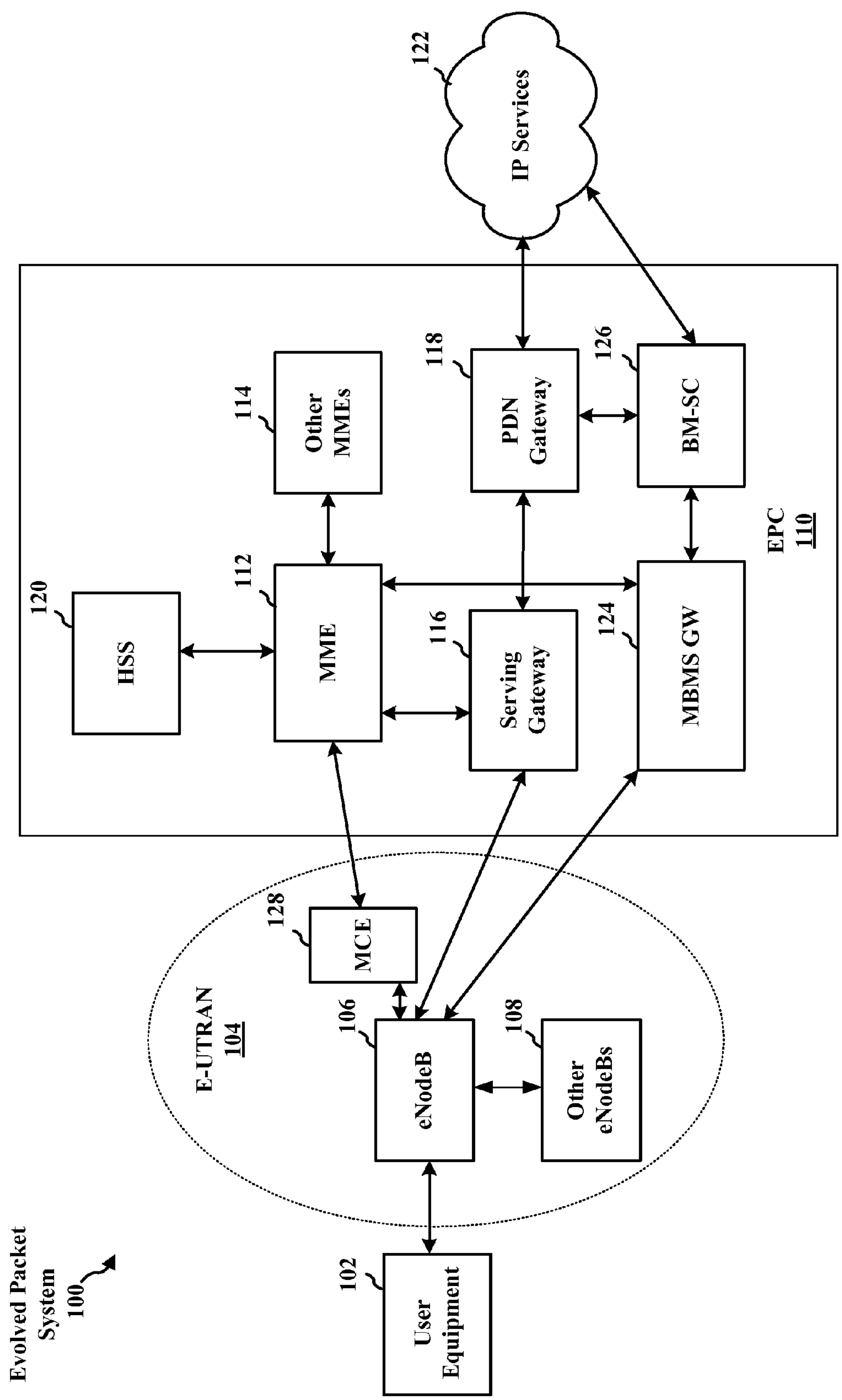
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. User IP packets may be transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a public land mobile network (PLMN), and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
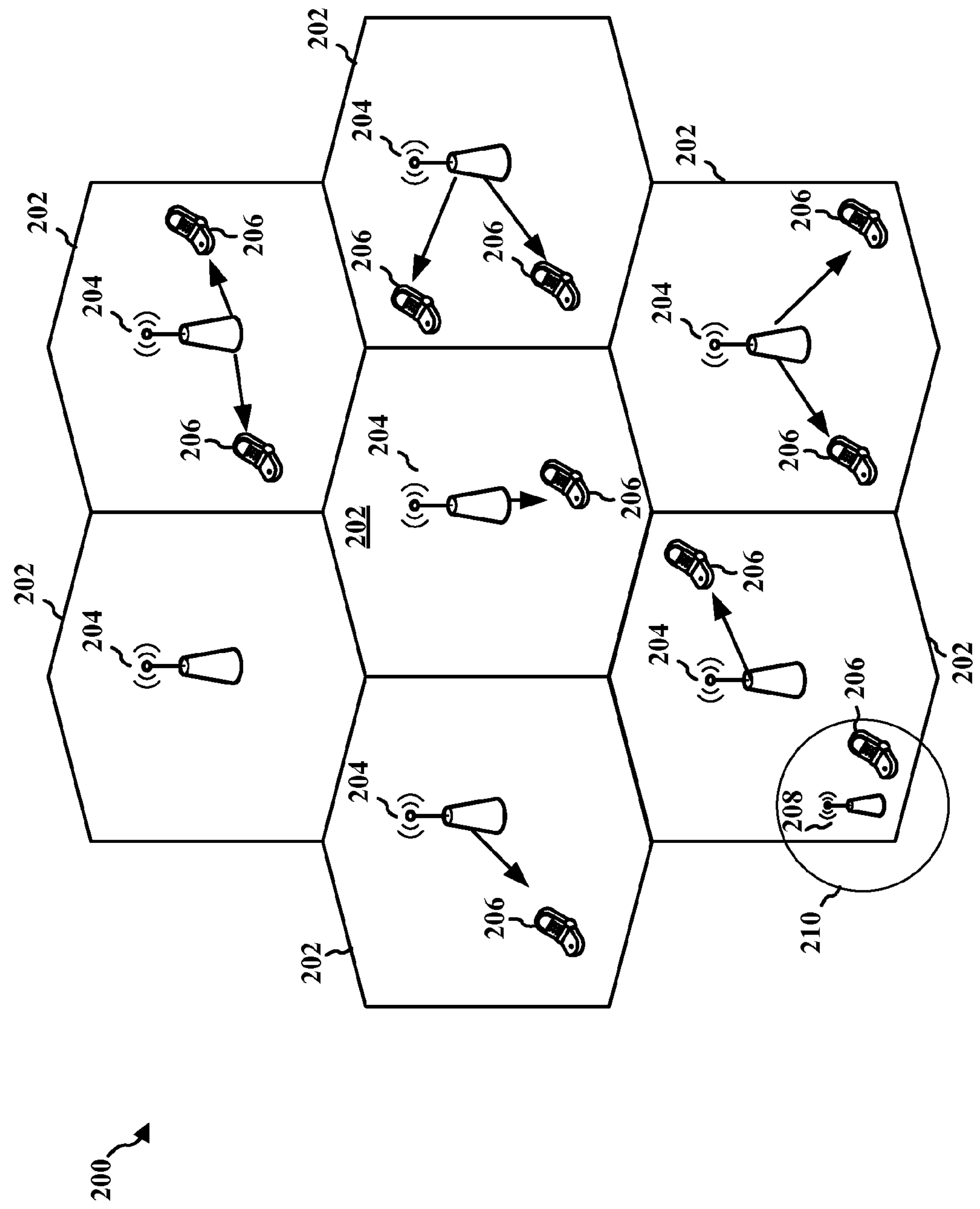
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
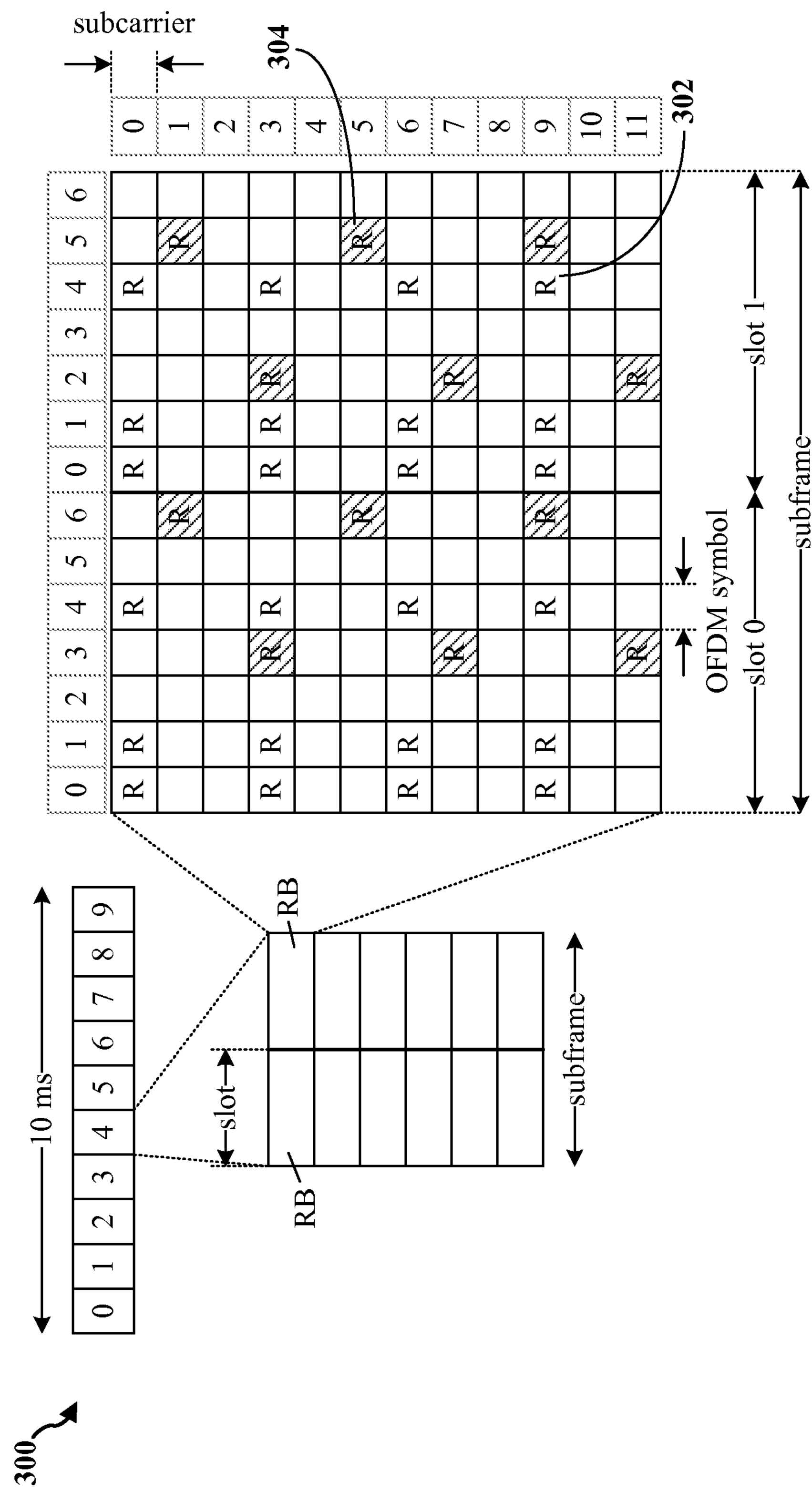
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block may contain 12 consecutive subcarriers in the frequency domain and, for a normal cyclic prefix in each OFDM symbol, 7 consecutive OFDM symbols in the time domain, or 84 resource elements. For an extended cyclic prefix, a resource block may contain 6 consecutive OFDM symbols in the time domain, or 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
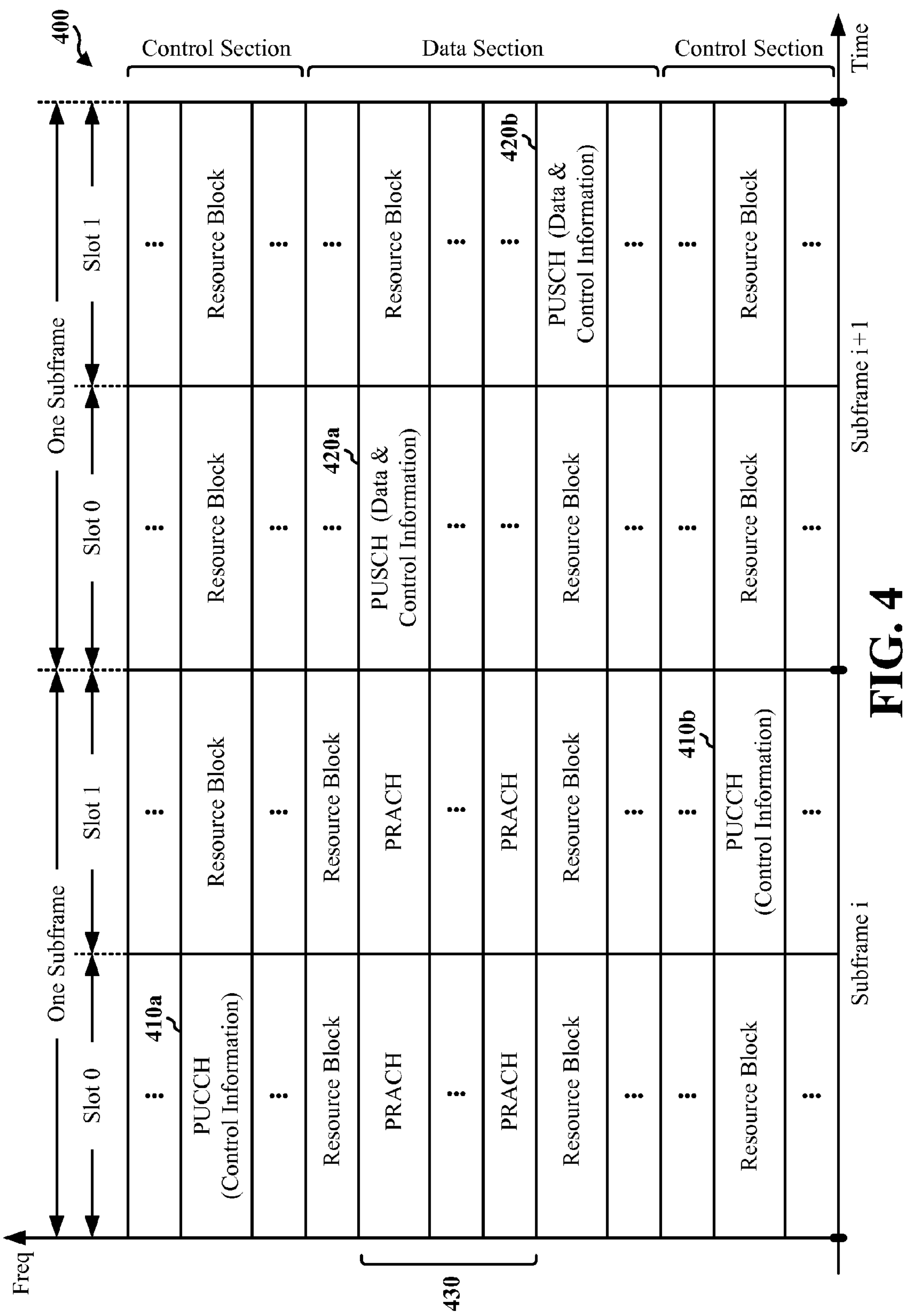
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
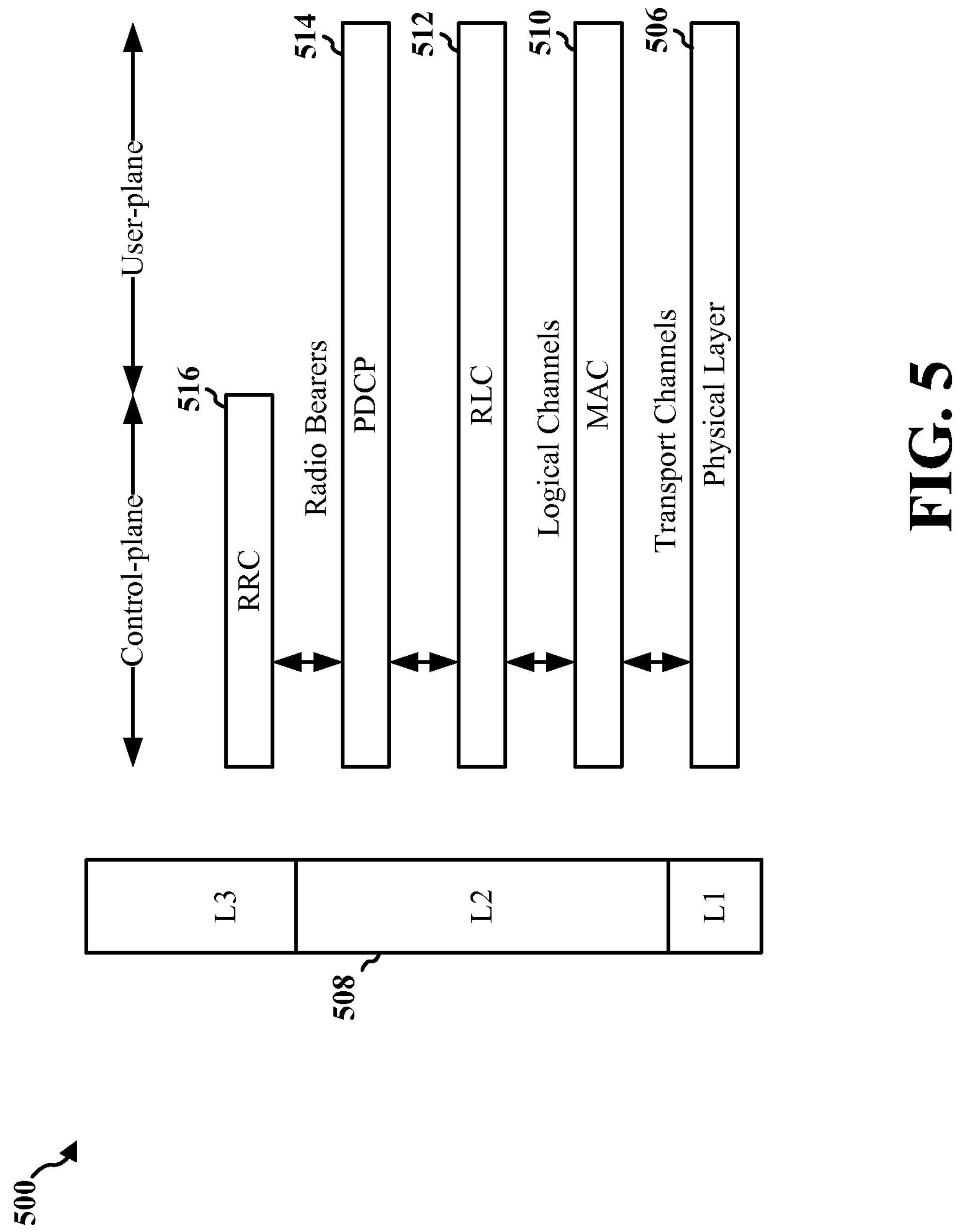
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
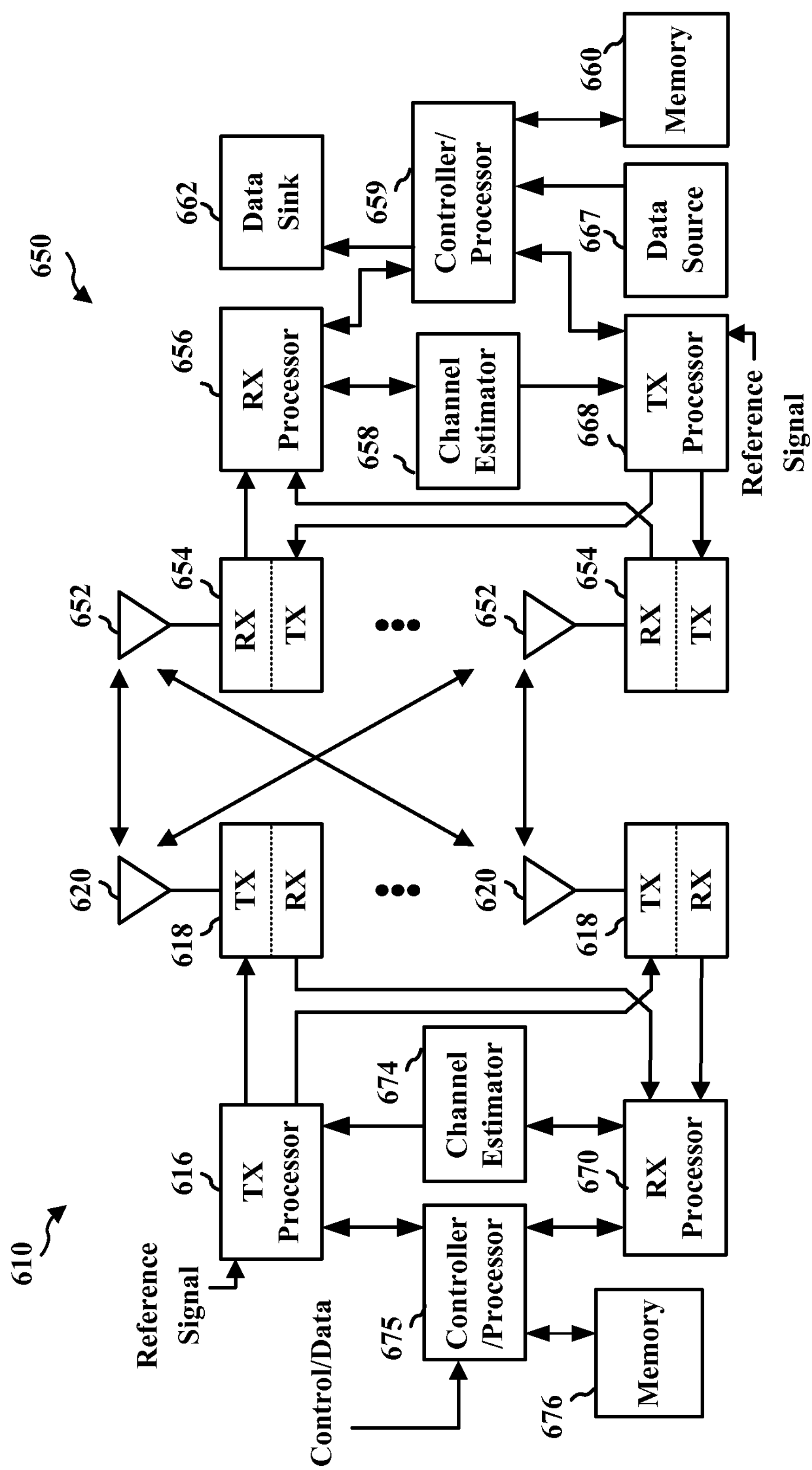
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figures 7A, 7B:
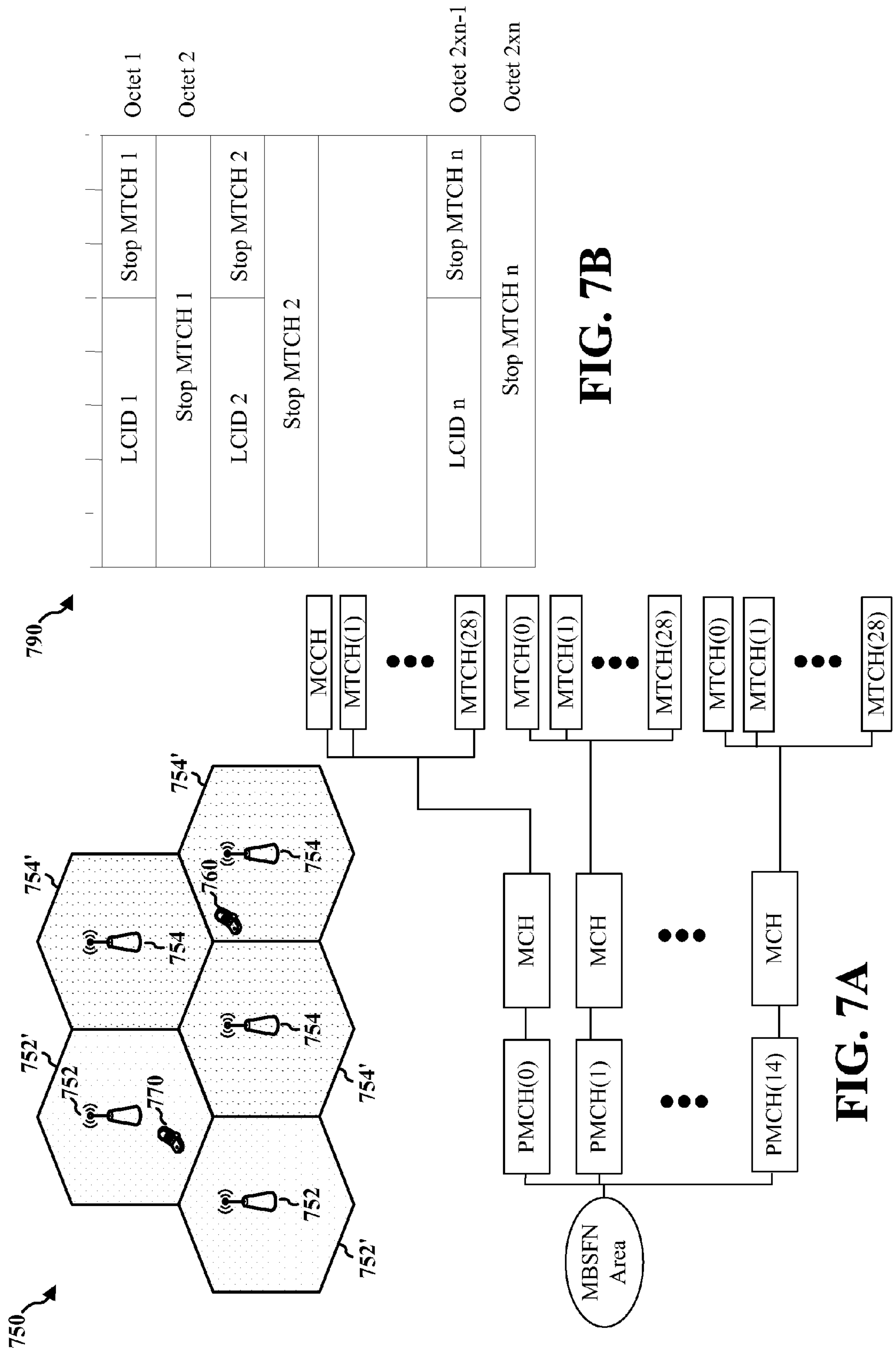
FIG. 7A is a diagram illustrating an example of an evolved Multimedia Broadcast Multicast Service channel configuration in a Multicast Broadcast Single Frequency Network (MBSFN).
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

A UE, such as UE 770, may be equipped with multiple antennas and may select one or more of the antennas for receiving a multicast/broadcast signal (e.g., an MBSFN signal carrying an eMBMS broadcast service). Such antenna selection may provide a number of benefits to the UE. For example, a UE equipped with two antennas may determine that a strength and/or a quality of a multicast/broadcast signal is sufficient for receiving the multicast/broadcast signal using one of the two antennas. Accordingly, the UE may enable (e.g., turn on) one of the antennas to receive the multicast/broadcast signal and may disable (e.g., turn off) the other of the two antennas to conserve battery power. As another example, the UE may use the other of the two antennas for sending and/or receiving signals using a different radio access technology (RAT), such as 1x voice, GSM voice, WiFi™, or other type of wireless communications.

In an aspect, a multicast/broadcast signal may be delivered using a fixed rate transmission for a majority of coverage areas and a majority of UEs in a network may receive such multicast/broadcast signal using a reduced number of antennas. With the same number of active receive antennas, antenna selection may bring additional selection diversity for UEs at the edge of an MBSFN area and may increase an MBSFN coverage area. For example, a UE may control the number of antennas that are used to receive a multicast/broadcast signal, where each antenna receives the multicast/broadcast signal over a different path. By receiving the same multicast/broadcast signal over multiple paths at multiple antennas, the UE may reduce the effects of channel fading and improve reception of the multicast/broadcast signal.

In an aspect, a UE operating in an idle mode (e.g., RRC idle mode) may select a number of antennas from among a set of antennas of the UE for receiving a multicast/broadcast signal (e.g., an MBSFN signal carrying an eMBMS broadcast service) based on a geometry factor of a serving cell. It should be understood that a UE operating in an idle mode typically camps on a particular cell and does not receive unicast data. However, such a UE operating in idle mode may receive a multicast/broadcast signal. In the present aspect, the UE may determine the serving cell geometry factor $G_{SC}$ based on equation (1):

$$G_{SC} = \frac{P_0}{\sum_i P_i + N_0} \quad \text{(equation 1)}$$

where $P_0$ represents the power of a serving cell signal detected by the UE, $P_i$ represents the power of a neighbor cell signal (also referred to as an interfering cell signal), and $N_0$ represents an amount of noise (e.g., thermal noise). Therefore, the serving cell geometry factor $G_{SC}$ in equation 1 is a long term measurement that indicates the ratio of the sum of the unicast signal power to the sum of the interference signal power plus noise. For example, the UE may determine $P_0$ based on the reference signal received power (RSRP) of a common reference signal (CRS) from the serving cell. For example, the UE may determine $P_i$ based on an RSRP of a CRS from a neighboring cell. In such example, the RSRP of the CRS measured by the UE may already include the amount of noise $N_0$ and, therefore, the UE may not need to perform additional measurements for individual values of $N_0$.

In an aspect, when the serving cell geometry factor $G_{SC}$ exceeds a threshold, the UE may select less than the total number of the antennas of the UE for receiving a multicast/broadcast signal. In an aspect, the multicast/broadcast signal may be an MBSFN signal carrying an eMBMS broadcast service and the threshold may be determined based on an MCS specified in MCCH. For example, the UE may determine the transmitted MCS of the service of its interest from MCCH and obtain a corresponding threshold to determine whether it can use a subset of antennas among the total available antennas. In another aspect, the multicast/broadcast signal may include paging information and/or one or more SIBs. It should be appreciated that the serving cell geometry may not capture the MBSFN benefit, that is, the MBSFN gain seen at the UE due to reception of the MBSFN signal transmitted by multiple cells in a synchronized manner. Therefore, the serving cell geometry factor $G_{SC}$ may be adjusted based on the correlation between unicast and MBSFN coverage. For example, for interior cells in a large MBSFN area, it is observed that the MBSFN coverage limit is approximately ⅔ to ¾ of the serving cell radius. In another example, when a single cell MBSFN is deployed, the MBSFN and unicast have the same coverage. Moreover, in one example, the network may be configured to provide coverage to 95% of UEs in the MBSFN area while the remaining 5% of UEs have marginal reception. However, it should be noted that the UEs at the edge of the interior serving cell in a large MBSFN area generally do not include the 5% of MBSFN UEs, since the UEs at the edge of the serving cell benefit from MBSFN gain and receive adequate coverage.

In an aspect, a UE operating in an idle mode (e.g., RRC idle mode) may select a number of antennas from among a set of antennas of the UE for receiving a multicast/broadcast signal based on a geometry factor of an MBSFN. In such aspect, the UE may determine the MBSFN geometry factor $G_{MBSFN}$ based on equation (2):

$$G_{MBSFN} = \frac{\sum_{n \in MBSFN} P_n}{\sum_{i \notin MBSFN} P_i + N_0} \quad \text{equation (2)}$$

where $P_n$ represents the power of a desired MBSFN signal, $P_i$ represents the power of a neighbor cell signal (also referred to as an interfering cell signal), and $N_0$ represents noise. In an aspect, $P_i$ may be a unicast signal or an MBSFN signal from MBSFN areas that do not include the desired MBSFN signal. Therefore, the MBSFN geometry factor $G_{MBSFN}$ in equation 2 is a long term measurement that indicates the ratio of the sum of the desired MBSFN signal power to the sum of the interference signal power plus noise. For example, $P_n$ may be determined by the UE based on an MBSFN reference signal (MBSFN-RS) measurement and $P_i$ may be determined by the UE based on a unicast signal or an RSRP of a CRS from a neighboring cell, or based on an MBSFN signal or an MBSFN RSRP from a neighbor MBSFN area. In an aspect, the threshold may be determined based on simulation data. In an aspect, when the MBSFN geometry factor $G_{MBSFN}$ exceeds a threshold, the UE may select less than a total number of the antennas of the UE for receiving a broadcast. The UE may determine the threshold based on an MCS specified in MCCH. For example, the UE may read the transmitted MCS of the service of interest from MCCH and obtain a corresponding threshold to determine whether the UE can use a subset of antennas among the total available antennas.

Figure 8:
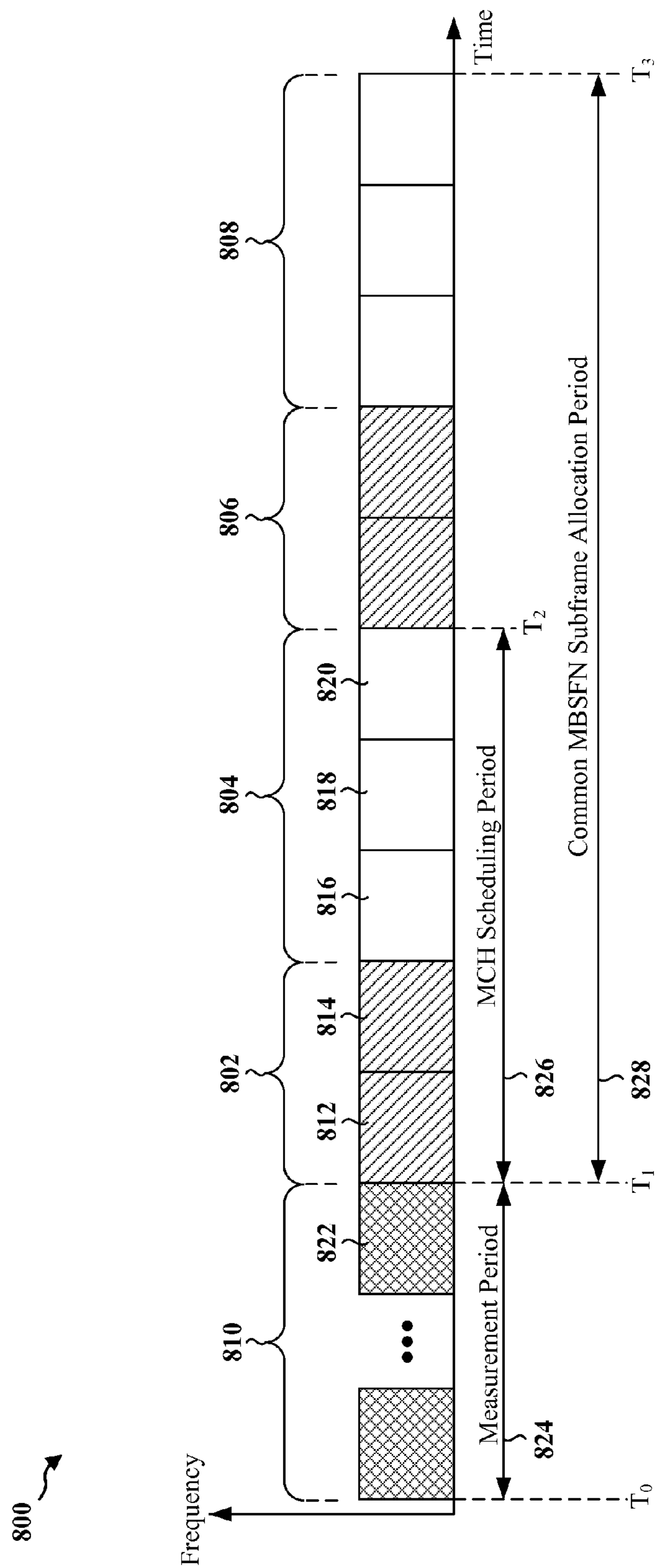
FIG. 8 is a diagram illustrating MBSFN subframes within an MBSFN frame.

FIG. 8 is a diagram 800 illustrating MBSFN subframes within an MBSFN frame. FIG. 8 includes a set of MBSFN subframes 802 and 806 configured for MBSFN data transmissions corresponding to a first logical channel (also referred to as MTCH 1), and a set of MBSFN subframes 804 and 808 configured for MBSFN data transmissions corresponding to a second logical channel (also referred to as MTCH 2). In the example configuration of FIG. 8, MBSFN subframes 802 and 806 each include two MBSFN subframes, such as MBSFN subframes 812 and 814, and MBSFN subframes 804 and 808 each include three MBSFN subframes, such as subframes 816, 818, and 820. It should be understood, however, that MBSFN subframes 802 and 806, and MBSFN subframes 804 and 808, may include a greater or lesser number of MBSFN subframes in other aspects. In the example configuration shown in FIG. 8, only MBSFN subframes in a particular MBSFN area are illustrated. It should be noted that these MBSFN subframes may have unicast subframes or MBSFN subframes of other MBSFN areas in between. FIG. 8 further includes an MCH scheduling period 826 beginning at time $T_1$ and ending at time $T_2$, and a common MBSFN subframe allocation period 828 beginning at time $T_1$ and ending at time $T_3$.

With reference to FIG. 8, a UE may be configured to receive a multicast/broadcast signal carrying a broadcast service of interest (e.g., MBSFN data transmissions in MBSFN subframes 802 corresponding to MTCH 1). In an aspect, at time $T_0$, the UE may determine one or more signal metrics for MBSFN data transmissions in MBSFN subframes 810, such as MBSFN subframe 822, that precede MBSFN subframes 802. For example, the UE may determine the one or more signal metrics by measuring MBSFN data transmissions received in MBSFN subframes 810. In an aspect, the one or more signal metrics may include an MBSFN RSRP measurement, an RSRQ measurement, and/or a signal-to-noise ratio (SNR) measurement of an MBSFN signal received by the UE in MBSFN subframes 810.

In an aspect, the MBSFN subframes 810 may include MBSFN data transmissions carrying a service other than the service of interest. For example, MBSFN subframes 810 may include MBSFN data transmissions corresponding to MTCH 2 or any other logical channel different from MTCH 1. The period of time between $T_0$ and $T_1$ during which the UE performs such measurements on MBSFN subframes 810 is also referred to as measurement period 824. For example the measurement period 824 may be 200 ms.

In an aspect, the UE may select a number of antennas from among a set of antennas of the UE for receiving a multicast/broadcast signal (e.g., MBSFN data transmissions) based on the one or more signal metrics determined by the UE during measurement period 824. In an aspect, the UE may select the number of antennas during the measurement period 824. In another aspect, the UE may select the number of antennas during the MCH scheduling period 826. In an aspect, the UE may select the number of antennas for receiving MBSFN data transmissions based on the one or more signal metrics determined by the UE for the MBSFN subframes 810 and based on a scheduled MCS for the MBSFN subframes 802 indicated in the MCCH. For example, if the one or more signal metrics determined by the UE for MBSFN subframes 810 exceed a threshold, the UE may select less than a total number of antennas of the UE for receiving the MBSFN subframes 802. In such example, if the UE is equipped with two antennas, the UE may select one of the two antennas for receiving the MBSFN subframes 802, and may disable (e.g., turn off) the other of the two antennas. Alternatively, the UE may use the other of the two antennas to receive data transmissions of a RAT that is different from MBSFN, such as Wi-Fi™ data transmissions. In an aspect, the UE may determine one or more signal quality metrics and update the selected number of antennas once for every antenna selection period. In an aspect, the antenna selection period may be determined by the UE depending on the signal quality metric being determined by the UE. For example, a UE may apply a relatively long antenna selection period for a slowly varying metric, such as path loss based measurements, because such a slowly varying metric does not change rapidly. Alternatively, a UE may apply a relatively short antenna selection period for rapidly varying metrics in order to perform the measurement more often, thereby improving the accuracy of the antenna selection choice at the cost of increased overhead and/or power consumption by the UE.

Figure 9:
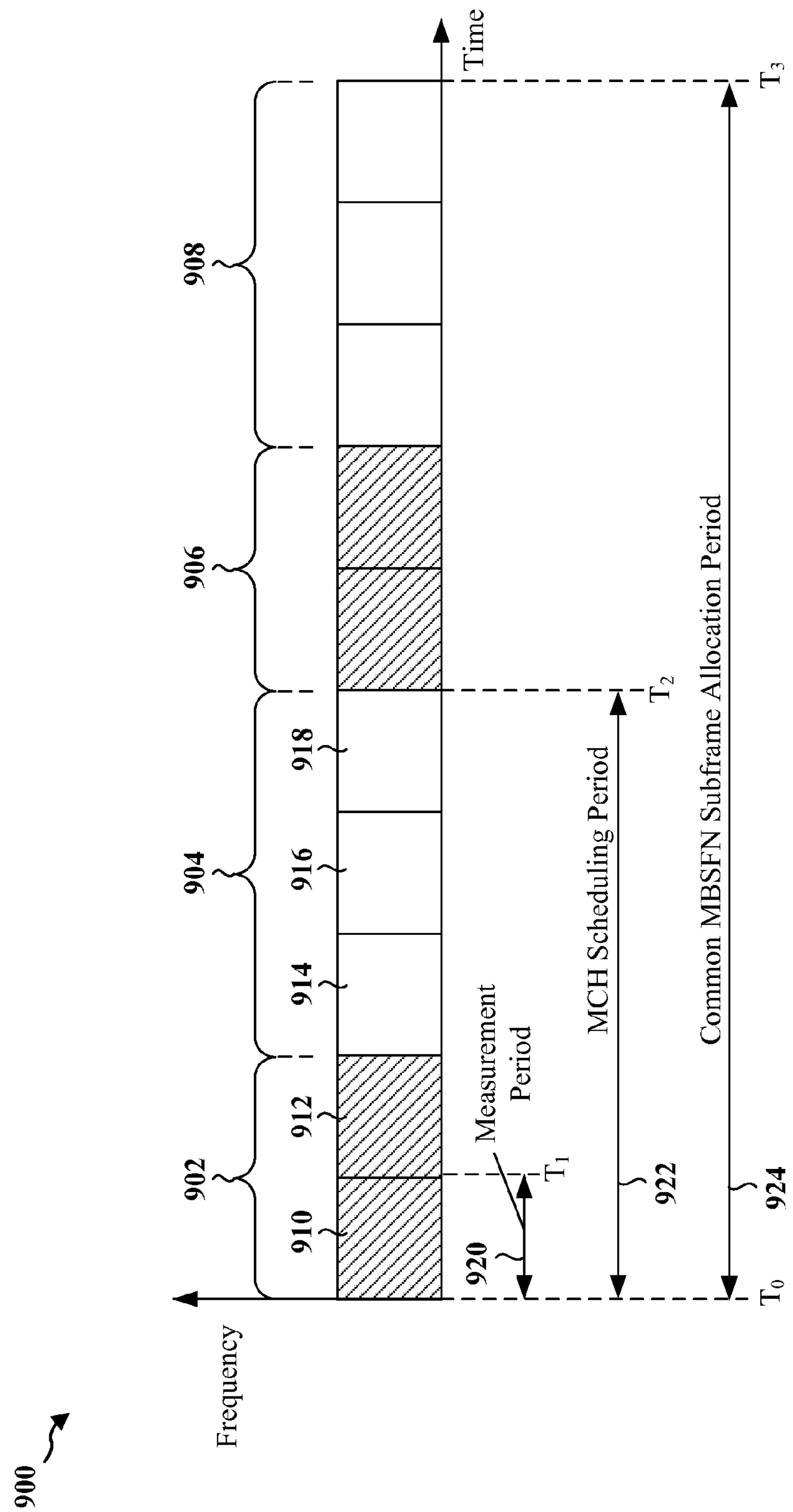
FIG. 9 is a diagram illustrating MBSFN subframes within an MBSFN frame.

FIG. 9 is a diagram 900 illustrating MBSFN subframes within an MBSFN frame. FIG. 9 includes MBSFN subframes 902 and 906 configured for MBSFN data transmissions corresponding to a first logical channel (also referred to as MTCH 1), and MBSFN subframes 904 and 908 configured for MBSFN data transmissions corresponding to a second logical channel (also referred to as MTCH 2). In the example configuration of FIG. 9, MBSFN subframes 902 and 906 each include two MBSFN subframes, such as MBSFN subframes 910 and 912, and MBSFN subframes 904 and 908 each include three MBSFN subframes, such as MBSFN subframes 914, 916, and 918. It should be understood, however, that MBSFN subframes 902 and 906 and MBSFN subframes 904 and 908 may include a greater or lesser number of MBSFN subframes in other aspects. FIG. 9 further includes an MCH scheduling period 922 beginning at time $T_0$ and ending at time $T_2$, and a common MBSFN subframe allocation period 924 beginning at time $T_0$ and ending at time $T_3$.

With reference to FIG. 9, a UE may be configured to receive a multicast/broadcast signal carrying a service of interest (e.g., MBSFN data transmissions in MBSFN subframes 902 corresponding to MTCH 1). In an aspect, at time $T_0$, the UE may determine one or more signal metrics for MBSFN data transmissions in MBSFN subframes 902, such as MBSFN subframe 910 and/or 912. For example, the UE may determine the one or more signal metrics by measuring MBSFN data transmissions received in MBSFN subframe 910 and/or 912. In an aspect, the one or more signal metrics may include an MBSFN RSRP measurement, an RSRQ measurement, and/or an RS signal-to-noise ratio (RS-SNR) measurement of an MBSFN signal received by the UE in MBSFN subframe 910 and/or 912.

In an aspect, the UE may determine the one or more signal metrics for MBSFN subframes 902 while receiving the service of interest using various antenna configurations. In one configuration, for example, if the UE is equipped with two antennas, the UE may use both antennas for measuring the MBSFN data transmissions received in MBSFN subframes 902 and may concurrently receive the service of interest included in the MBSFN subframes 902. In another configuration, for example, if the UE is equipped with two antennas and the first antenna is currently being used by the UE to receive data transmissions of a RAT that is different from MBSFN, such as Wi-Fi™ data transmissions, the UE may measure the MBSFN data transmissions received in MBSFN subframes 902 using the second antenna. Thereafter, the UE may switch the two antennas such that that the second antenna is used for receiving the Wi-Fi™ data transmissions and the first antenna is used for measuring the MBSFN data transmissions received in MBSFN subframes 902. Therefore, in such a configuration, the UE may measure the MBSFN data transmissions received in MBSFN subframes 902 using the first antenna and the second antenna with minimal disruption to the reception of the Wi-Fi™ data transmissions.

With reference to FIG. 9, the period of time between $T_0$ and $T_1$ during which the UE performs such measurements on MBSFN subframes 902 is also referred to as measurement period 920. For example the measurement period 920 may be 1.0 ms.

In an aspect, the UE may select a number of antennas from among a set of antennas of the UE for receiving a multicast/broadcast signal (e.g., an MBSFN data transmission) based on the one or more signal metrics determined by the UE during measurement period 920. Since selection of the number of antennas may be done once every measurement period (e.g., measurement period 920), such selection of antennas may be referred to as semi-static antenna switching.

In an aspect, the UE may select the number of antennas during the measurement period 920. In another aspect, the UE may select the number of antennas during the MCH scheduling period 922. In an aspect, the UE may select the number of antennas for receiving MBSFN data transmissions based on the one or more metrics determined by the UE for one or more of MBSFN subframes 902 and based on a scheduled MCS for the MBSFN subframes 902 indicated in the MCCH. For example, if the one or more signal metrics determined by the UE for MBSFN subframe 910 exceeds a threshold, the UE may select less than a total number of antennas of the UE for receiving the MBSFN subframes 902 and/or MBSFN subframes 906. In such example, if the UE is equipped with two antennas, the UE may select one antenna for receiving the MBSFN subframes 902 and/or 906, and may disable (e.g., turn off) the other of the two antennas. Alternatively, the UE may use the other of the two antennas to receive data transmissions of a RAT that is different from MBSFN, such as Wi-Fi™ data transmissions. In an aspect, the UE may determine one or more signal metrics and update the selected number of antennas once for every antenna selection period.

In an aspect, the UE may measure one or more of MBSFN subframes 810 or MBSFN subframes 902 and select a number of antennas as discussed supra while operating in an idle mode (e.g., RRC idle mode) or an active mode (e.g., RRC connected mode). In the aspects discussed with reference to FIG. 8, when the UE is operating in an idle mode, the UE may wake up prior to time $T_1$ in order to receive MBSFN subframes 802 carrying the service of interest. In the aspects discussed with reference to FIG. 9, when the UE is operating in an idle mode, the UE may wake up prior to $T_2$ in order to receive MBSFN subframes 906 carrying the service of interest.

In an aspect, when the UE is operating in an active mode (e.g., RRC connected mode), the UE may select an appropriate number of antennas needed for reception of unicast transmissions regardless of whether the determined one or more MBSFN signal metrics exceeds a threshold. For example, if the UE operating in an active mode is equipped with two antennas and both antennas are needed to properly receive unicast transmissions, the UE may enable (e.g., turn on) both antennas to receive the unicast transmissions and to receive multicast/broadcast signals (e.g., MBSFN transmissions). In another aspect, the UE may select a number of antennas to receive unicast transmissions and may select a lesser number of antennas for receiving multicast/broadcast signals (e.g., MBSFN transmissions). For example, if the UE has two antennas, the UE may enable both antennas to receive unicast transmissions, and may disable one of the two antennas and enable the other of the two antennas to receive MBSFN transmissions. The antenna enabled (or antenna disabled) may be based on received MBSFN signal strength of the antenna. It should be understood that the aspects disclosed herein may be applied to a UE that is equipped with two or more antennas. For example, if a UE has M receive antennas, where $M>1$, the UE may use an N number of these M antennas, where $N \leq M$, for unicast reception. In such example, the UE may use a K number of antennas, where $K \leq N$, to receive an MBSFN signal where the K antennas are the same or a subset of the N antennas. It should be noted that when the UE decides to use K antennas, the UE may need to evaluate the received MBSFN signal strength on any subset of K antennas out of the N antennas. For example, the UE may measure the received MBSFN signal strength on various subsets of K antennas and select the subset of K antennas which meets or exceeds a signal strength threshold. As another alternative, the UE may select a subset of K antennas which meets or exceeds a signal strength threshold and which reduces power consumption.

In an aspect, the previously discussed threshold may be set by the UE for a given MCS based on a channel model, a channel variation, and/or an MBSFN area. For example, the nominal threshold may be an SNR value determined by the UE based on a required SNR for each MCS. Such SNR to MCS mapping curve may be generally derived via simulation. In an aspect, the UE may adjust the threshold based on a frame error rate (FER) or a packet error rate (PER) detected by the UE in order to optimize antenna selection performance. For example, if the threshold is an SNR value, the UE may apply an outer loop algorithm based on the FER to adjust the SNR value so as to remove the discrepancy between SNR to MCS with respect to different MBSFN deployment scenarios.

In an aspect, the UE may apply the outer loop algorithm by determining whether the FER detected by the UE is below a certain percentage (e.g., whether FER <1%) or above a certain percentage (e.g., whether FER >1%). For example, if the FER is below a certain percentage, the UE may decrease the threshold based on equation (3):

$$T(SNR\_i+1)=T(SNR\_i)-\Delta 1 \quad \text{(equation 3)}$$

where T(SNR_i) represents the current threshold value, Δ1 represents a threshold decrement value, and T(SNR_i+1) represents the adjusted threshold value. For example, the threshold decrement value Δ1 may be 0.5 dB. It should be noted that the threshold may be adjusted independent of the number of antennas available for selection. However, if the FER is above a certain percentage, the UE may increase the threshold based on equation (4):

$$T(SNR\_i+1)=T(SNR\_i)+\Delta 2 \quad \text{(equation 4)}$$

where T(SNR_i) represents the current threshold value, Δ2 represents a threshold increment value, and T(SNR_i+1) represents the adjusted threshold value. For example, the threshold increment value Δ2 may be 1.0 dB. In an aspect, the UE may apply equation 4 so long as the current threshold value (e.g., T(SNR_i)) is less than a maximum threshold value (e.g., T_max). In an aspect, the threshold decrement value Δ1 may be different from the threshold increment value Δ2 to allow the threshold to be increased or decreased at different rates. For example, the threshold may need to be increased at a relatively fast rate to avoid unnecessary packet failure, while the threshold may be decreased at a relatively slow rate.

Figure 10:
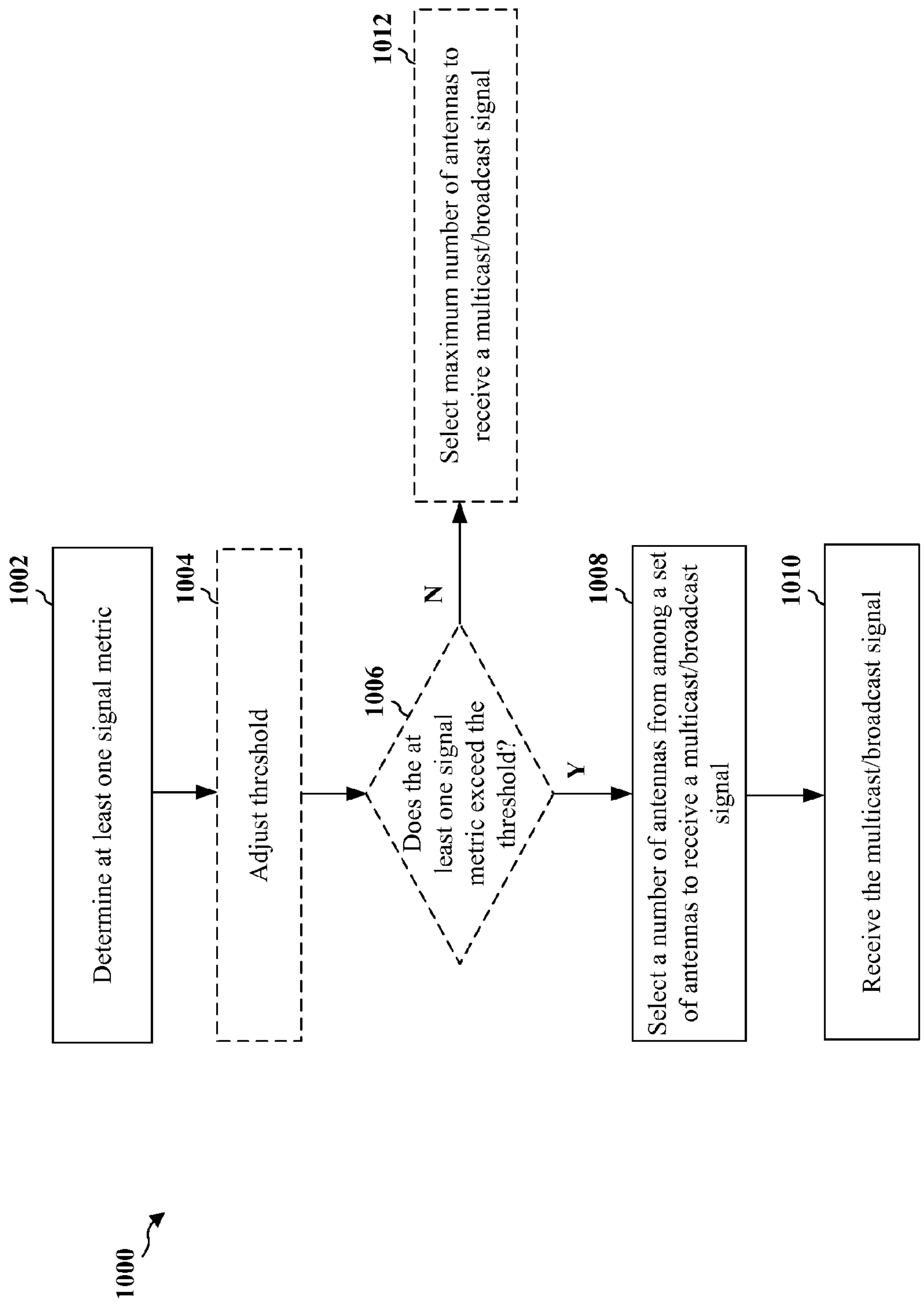
FIG. 10 is a flow chart of a method of wireless communication.

FIG. 10 is a flow chart 1000 of a method of wireless communication. The method may be performed by a UE. It should be understood that the steps indicated with dotted lines in FIG. 10 represent optional steps. At step 1002, the UE determines at least one signal metric. For example, the at least one signal metric may be determined with respect to a multicast/broadcast signal received by the UE, such as an MBMS transmission, an eMBMS transmission, a paging signal, one or more SIBs, or any other signals received by the UE. In an aspect, the at least one signal metric may be a serving cell geometry factor, such as the serving cell geometry factor $G_{SC}$ determined according to equation 1, which is a long term measurement that indicates the ratio of the sum of the unicast signal power to the sum of the interference signal power plus noise. In another aspect, the at least one signal metric may be an MBSFN geometry factor, such as the MBSFN geometry factor $G_{MBSFN}$ determined according to equation 2, which is a long term measurement that indicates the ratio of the sum of the desired MBSFN signal power to the sum of the interference signal power plus noise. In another aspect, the at least one signal metric may be an RSRP measurement result, an RSRQ measurement result, and/or an SNR measurement result of an MBSFN signal received by the UE in MBSFN subframes that precede a service of interest. For example, with reference to FIG. 8, at time $T_0$, the UE may determine an RSRP measurement result, an RSRQ measurement result, and/or an SNR measurement result for MBSFN data transmissions in MBSFN subframes 810 that precede MBSFN subframes 802 carrying a broadcast service of interest. As another example, with reference to FIG. 9, at time $T_0$, the UE may determine an RSRP measurement result, an RSRQ measurement result, and/or an SNR measurement result for MBSFN data transmissions in MBSFN subframes 902 carrying a broadcast service of interest, such as MBSFN subframe 910 and/or 912.

At step 1004, the UE may adjust a threshold. For example, the threshold may be a serving cell geometry factor ($G_{SC}$) value, an MBSFN geometry factor ($G_{MBSFN}$) value, an RSRP value, an RSRQ value, or an SNR value. In an aspect, the UE may adjust the threshold based on an FER or PER detected by the UE in order to optimize antenna selection performance. For example, if the threshold is an SNR value, the UE may apply an outer loop algorithm based on the FER to adjust the SNR value by determining whether the FER detected by the UE is below a certain percentage (e.g., whether FER <1%) or above a certain percentage (e.g., whether FER >1%). For example, if the FER is below a certain percentage, the UE may decrease the threshold based on equation 3. However, if the FER is above a certain percentage, the UE may increase the threshold based on equation 4. In an aspect, the UE may adjust the threshold by updating a current value of the threshold stored in a memory (or register) or by updating a nominal value based on the SNR to MCS mapping table.

At step 1006, the UE determines whether the at least one signal metric exceeds a threshold. In an aspect, the UE may determine whether the at least one signal metric exceeds a threshold by implementing a comparator configured to compare the at least one signal metric to the threshold. In another aspect, a processor of the UE may compare the at least one signal metric to the threshold. If the at least one signal metric does not exceed the threshold (1006), then at step 1012, the UE selects the maximum number of antennas of the UE to receive a multicast/broadcast signal. However, if the at least one signal metric exceeds the corresponding threshold (1006), then at step 1008, the UE selects a number of antennas from among a set of antennas of the UE for receiving the multicast/broadcast signal. For example, if the serving cell geometry factor $G_{SC}$, MBSFN geometry factor $G_{MBSFN}$, RSRP measurement, RSRQ measurement, or SNR measurement of an MBSFN signal exceeds the corresponding threshold, the UE may select less than the total number of the antennas of the UE for receiving the multicast/broadcast signal. For example, if the UE is equipped with two antennas, the UE may select less than the total number of the antennas for receiving the multicast/broadcast signal by enabling (e.g., turning on) one antenna for receiving the multicast/broadcast signal and disabling (e.g., turning off) the other antenna, e.g., the antenna with the highest signal strength may be enabled and the other antenna disabled. Alternatively, the UE may use the other antenna for sending and/or receiving signals using a different RAT, such as 1× voice, GSM voice, WiFi™, or other type of wireless communications. In an aspect, the UE may enable and/or disable its antennas using control signals and/or hardware components. For example, the UE may enable an antenna by sending a control signal to a switch that provides power to the antenna. As another example, a UE may disable an antenna by sending a control signal to a switch that cuts off power to the antenna.

In an aspect, when the UE is operating in an active mode, the UE may select an appropriate number of antennas needed for reception of unicast transmissions regardless of whether the at least one signal metric exceeds a threshold. In such aspect, the number of selected antennas may be equal to a number of antennas required for a unicast reception or less than the number of antennas required for the unicast reception. For example, if the UE operating in an active mode is equipped with two antennas and both antennas are needed to properly receive unicast transmissions, the UE may enable (e.g., turn on) both antennas to receive the unicast transmissions and to receive multicast/broadcast signals. As another example, the UE may select a number of antennas to receive unicast transmissions and may select a lesser number of antennas for receiving multicast/broadcast signals. In such example, if the UE has two antennas, the UE may enable both antennas to receive unicast transmissions, and may disable one of the two antennas and enable the other of the two antennas to receive multicast/broadcast signals.

In an aspect, if the UE has more than 2 antennas, the UE may perform an antenna selection process similar to an antenna selection process performed for unicast signals. For example, the UE may perform measurements, such as measurements of an MBSFN signal strength (RSRP, RSRQ, SNR), for every antenna configuration, e.g., for 4 antennas the measurement may be done using all four antennas (one measurement), for each subset of 3 antennas (4 measurements), for each subset of 2 antennas (6 measurements) and for each individual antenna (4 measurements) for a total of 15 measurements. Then the UE may determine the qualified antenna candidates based on the respective measurement of the configuration being greater than or equal to the corresponding threshold value for the current MCS level. Finally, the UE may select one of the qualified antenna configurations based on power consumption of the configuration, e.g., selecting the qualified configuration that reduces UE power consumption. In another example, the UE having more than two antennas may perform a geometry based long term antenna selection process by measuring a geometry factor (e.g., $G_{SC}$ or $G_{MBSFN}$) for each antenna configuration as previously discussed (e.g., a UE having 4 antennas performing a total of 15 measurements). Accordingly, the UE may determine the qualified antenna candidates and may select one of the qualified antenna configurations based on power consumption of the configuration, e.g., selecting the qualified configuration that reduces UE power consumption.

At step 1010, the UE receives the multicast/broadcast signal using the selected number of antennas. In an aspect, the method described with respect to FIG. 10 may be repeated by the UE once every antenna selection period to update the selected number of antennas.

Figure 11:
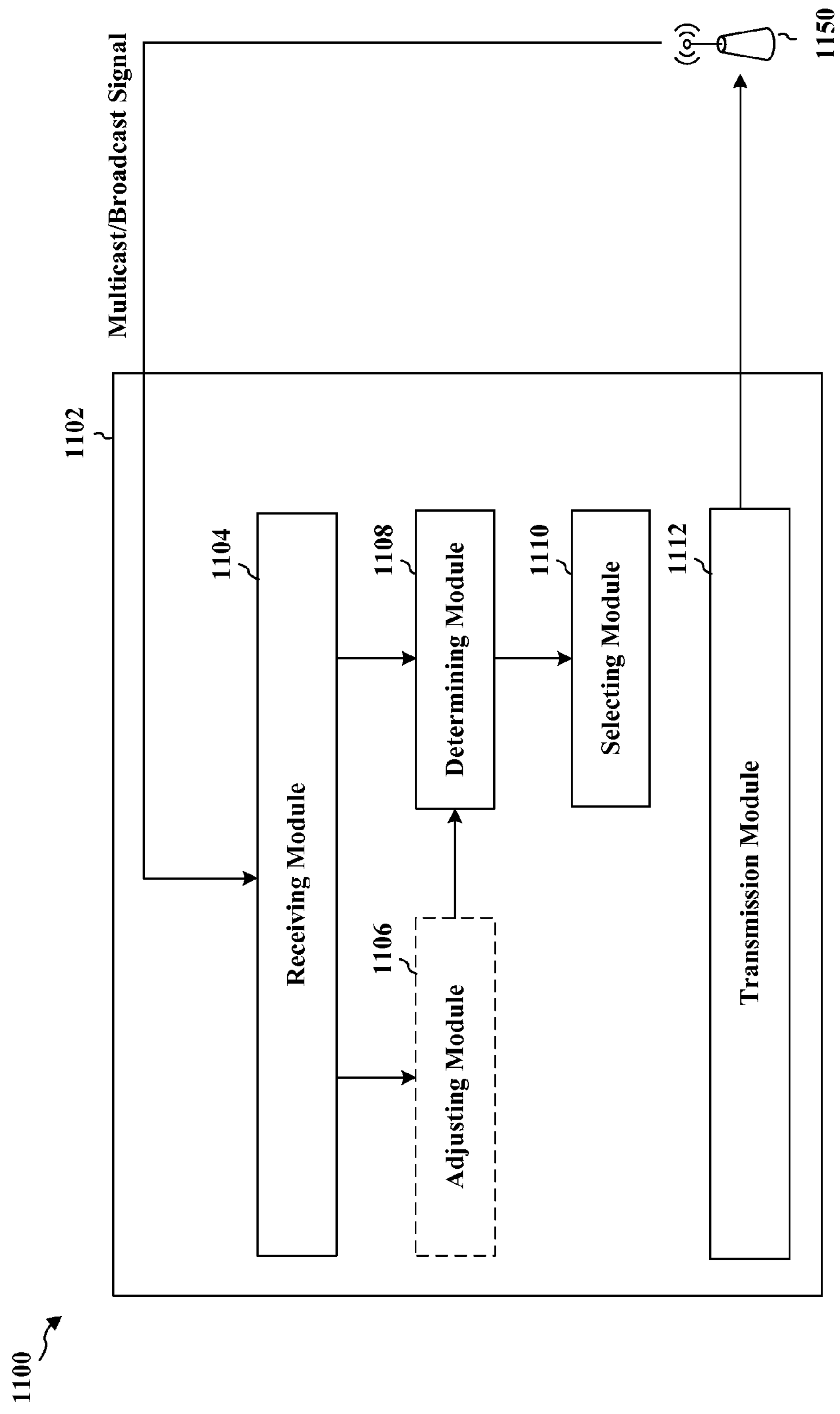
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a module 1104 that receives multicast/broadcast signals from a base station (e.g., base station 1150), a module 1106 that adjusts a threshold, a module 1108 that determines at least one signal metric and determines whether the at least one signal metric exceeds the threshold, a module 1110 that selects a number of antennas from among a set of antennas for receiving a multicast/broadcast signal based on the at least one signal metric, and a module 1112 for sending transmissions to a base station (e.g., base station 1150). The apparatus may include additional modules that perform each of the steps of the algorithm in the aforementioned flow chart of FIG. 10. As such, each step in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
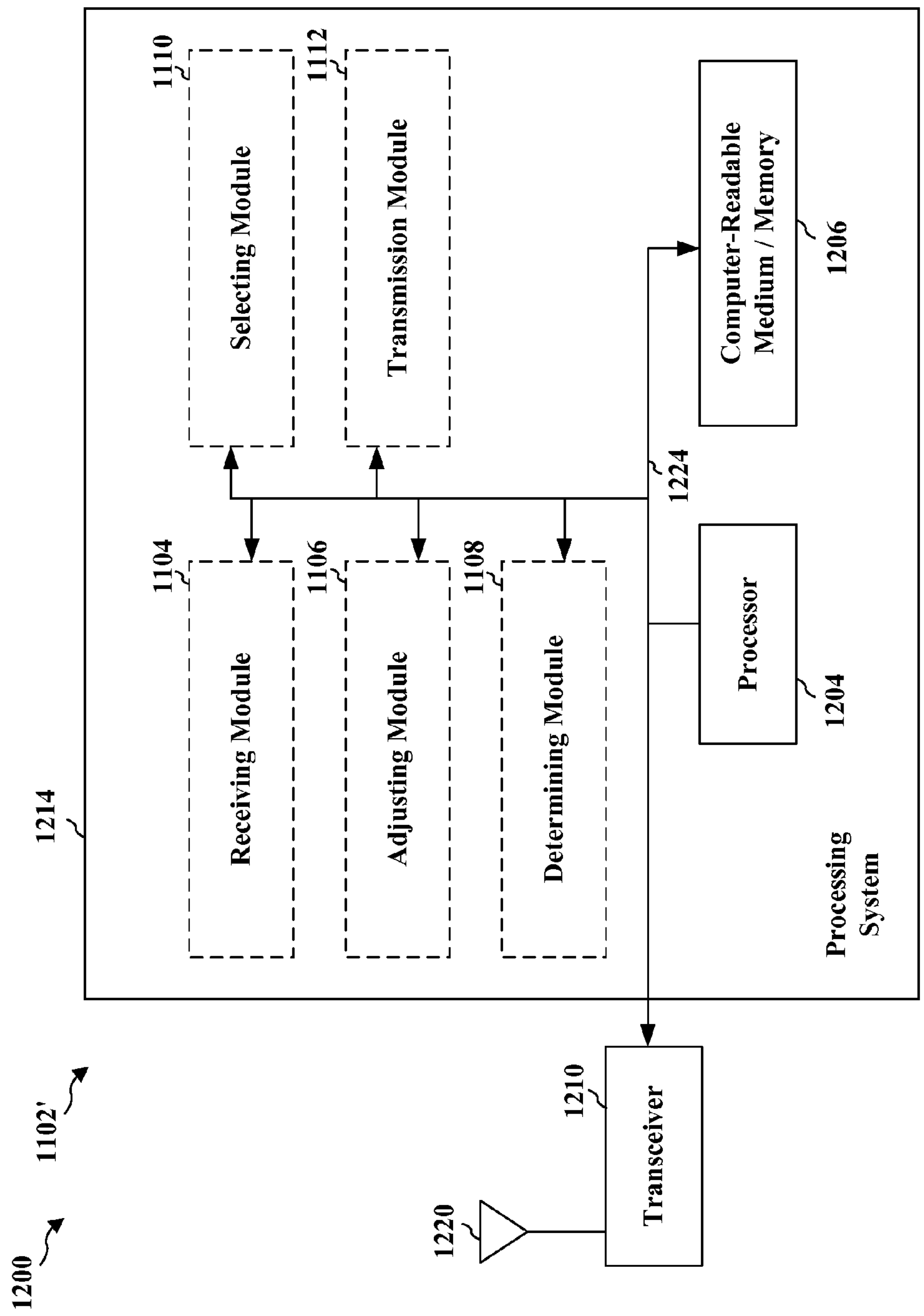
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, and 1112, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1112, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, and 1112. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for determining at least one signal metric, means for selecting a number of antennas from among a set of antennas for receiving a multicast/broadcast signal based on the at least one signal metric, means for determining whether the at least one signal metric exceeds a threshold, and means for adjusting the threshold based on a frame error rate. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising: determining at least one signal metric of one or more subframes that precede a desired service or one or more subframes that include the desired service, wherein the at least one signal metric is one of a serving cell geometry factor or a multicast-broadcast single-frequency network (MBSFN) geometry factor, and wherein the serving cell geometry factor includes a ratio of a unicast signal power to an interference signal power and the MBSFN geometry factor includes a ratio of a MBSFN signal power to the interference signal power; and selecting a number of antennas from among a set of antennas of the UE for receiving a multicast/broadcast signal based on the at least one signal metric.

2. The method of claim 1, further comprising determining whether the at least one signal metric exceeds a threshold, wherein the number of selected antennas is less than a total number of antennas in the set when the at least one signal metric exceeds the threshold.

3. The method of claim 2, further comprising adjusting the threshold based on a frame error rate.

4. The method of claim 1, wherein determining the at least one signal metric comprises measuring the strength of the at least one MBSFN signal in one or more MBSFN subframes.

5. The method of claim 4, wherein the one or more MBSFN subframes comprise MBSFN subframes that precede the desired service or MBSFN subframes that include the desired service.

6. The method of claim 5, wherein the determination of the strength of the at least one MBSFN signal and the selection of the number of antennas for an evolved multimedia broadcast multicast service (eMBMS) reception are performed for each of a plurality of antenna selection periods.

7. The method of claim 1, wherein the number of selected antennas is equal to a number of antennas required for a unicast reception or less than the number of antennas required for the unicast reception.

8. The method of claim 1, wherein the multicast/broadcast signal is at least one of a multimedia broadcast multicast service (MBMS) transmission, an evolved multimedia broadcast multicast service (eMBMS) transmission, a paging signal, or one or more system information blocks (SIBs).

9. An apparatus for wireless communication, comprising: means for determining at least one signal metric of one or more subframes that precede a desired service or one or more subframes that include the desired service, wherein the at least one signal metric is one of a serving cell geometry factor or a multicast-broadcast single-frequency network (MBSFN) geometry factor, and wherein the serving cell geometry factor includes a ratio of a unicast signal power to an interference signal power and the MBSFN geometry factor includes a ratio of a MBSFN signal power to the interference signal power; and means for selecting a number of antennas from among a set of antennas of a user equipment (UE) for receiving a multicast/broadcast signal based on the at least one signal metric.

10. The apparatus of claim 9, further comprising means for determining whether the at least one signal metric exceeds a threshold, wherein the number of selected antennas is less than a total number of antennas in the set when the at least one signal metric exceeds the threshold.

11. The apparatus of claim 10, further comprising means for adjusting the threshold based on a frame error rate.

12. The apparatus of claim 9, wherein determining the at least one signal metric comprises measuring the strength of the at least one MBSFN signal in one or more MBSFN subframes.

13. The apparatus of claim 12, wherein the one or more MBSFN subframes comprise MBSFN subframes that precede the desired service or MBSFN subframes that include the desired service.

14. The apparatus of claim 13, wherein the determination of the strength of the at least one MBSFN signal and the selection of the number of antennas for an evolved multimedia broadcast multicast service (eMBMS) reception are performed for each of a plurality of antenna selection periods.

15. The apparatus of claim 9, wherein the number of selected antennas is equal to a number of antennas required for a unicast reception or less than the number of antennas required for the unicast reception.

16. The apparatus of claim 9, wherein the multicast/broadcast signal is at least one of a multimedia broadcast multicast service (MBMS) transmission, an evolved multimedia broadcast multicast service (eMBMS) transmission, a paging signal, or one or more system information blocks (SIBs).

17. An apparatus for wireless communication, comprising: a memory; and at least one processor coupled to the memory and configured to: determine at least one signal metric of one or more subframes that precede a desired service or one or more subframes that include the desired service, wherein the at least one signal metric is one of a serving cell geometry factor or a multicast-broadcast single-frequency network (MBSFN) geometry factor, and wherein the serving cell geometry factor includes a ratio of a unicast signal power to an interference signal power and the MBSFN geometry factor includes a ratio of a MBSFN signal power to the interference signal power; and select a number of antennas from among a set of antennas of a user equipment (UE) for receiving a multicast/broadcast signal based on the at least one signal metric.

18. The apparatus of claim 17, wherein the at least one processor is further configured to determine whether the at least one signal metric exceeds a threshold, wherein the number of selected antennas is less than a total number of antennas in the set when the at least one signal metric exceeds the threshold.

19. The apparatus of claim 18, wherein the at least one processor is further configured to adjust the threshold based on a frame error rate.

20. The apparatus of claim 17, wherein determining the at least one signal metric comprises measuring the strength of the at least one MBSFN signal in one or more MBSFN subframes.

21. The apparatus of claim 20, wherein the one or more MBSFN subframes comprise MBSFN subframes that precede the desired service or MBSFN subframes that include the desired service.

22. The apparatus of claim 21, wherein the determination of the strength of the at least one MBSFN signal and the selection of the number of antennas for an evolved multimedia broadcast multicast service (eMBMS) reception are performed for each of a plurality of antenna selection periods.

23. The apparatus of claim 17, wherein the number of selected antennas is equal to a number of antennas required for a unicast reception or less than the number of antennas required for the unicast reception.

24. The apparatus of claim 17, wherein the multicast/broadcast signal is at least one of a multimedia broadcast multicast service (MBMS) transmission, an evolved multimedia broadcast multicast service (eMBMS) transmission, a paging signal, or one or more system information blocks (SIBs).

25. A non-transitory computer-readable medium comprising code that when executed on at least one processor causes the at least one processor to: determine at least one signal metric of one or more subframes that precede a desired service or one or more subframes that include the desired service, wherein the at least one signal metric is one of a serving cell geometry factor or a multicast-broadcast single-frequency network (MBSFN) geometry factor, and wherein the serving cell geometry factor includes a ratio of a unicast signal power to an interference signal power and the MBSFN geometry factor includes a ratio of a MBSFN signal power to the interference signal power; and select a number of antennas from among a set of antennas of a user equipment (UE) for receiving a multicast/broadcast signal based on the at least one signal metric.

26. The non-transitory computer-readable medium of claim 25, the computer-readable medium further comprising code for determining whether the at least one signal metric exceeds a threshold, wherein the number of selected antennas is less than a total number of antennas in the set when the at least one signal metric exceeds the threshold.

* * * * *